(12) United States Patent
Trainin et al.

(10) Patent No.: US 9,985,901 B2
(45) Date of Patent: May 29, 2018

(54) APPARATUS, SYSTEM AND METHOD OF WIRELESS COMMUNICATION TO A PLURALITY OF STATIONS

(71) Applicant: INTEL IP CORPORATION, Santa Clara, CA (US)

(72) Inventors: Solomon B. Trainin, Haifa (IL); Igor Brainman, Kfar Saba (IL); Michael Glik, Kfar Saba (IL)

(73) Assignee: INTEL IP CORPORATION, Santa Clara, CA (US)

(*) Notice: Subject to any disclaimer, the term of this patent is extended or adjusted under 35 U.S.C. 154(b) by 322 days.

(21) Appl. No.: 14/998,372

(22) Filed: Dec. 26, 2015

(65) Prior Publication Data

US 2016/0352644 A1    Dec. 1, 2016

Related U.S. Application Data

(60) Provisional application No. 62/167,022, filed on May 27, 2015.

(51) Int. Cl.

| *H04L 12/801* | (2013.01) |
| *H04L 1/00* | (2006.01) |
| *H04L 12/18* | (2006.01) |
| *H04L 12/891* | (2013.01) |
| *H04W 84/12* | (2009.01) |

(52) U.S. Cl.
CPC ............... *H04L 47/34* (2013.01); *H04L 1/00* (2013.01); *H04L 12/1863* (2013.01); *H04L 47/41* (2013.01); *H04W 84/12* (2013.01)

(58) Field of Classification Search
CPC ..... H04L 47/34; H04L 12/1863; H04L 47/41; H04L 1/00; H04W 84/12
See application file for complete search history.

(56) References Cited

U.S. PATENT DOCUMENTS 5,396,537 A * 3/1995 Schwendeman ..... H04M 11/022
340/7.23
8,627,074 B1    1/2014 Goel et al.
(Continued)

FOREIGN PATENT DOCUMENTS

| JP | 2012519426 | 8/2012 |
| WO | 2007117947 | 10/2007 |

OTHER PUBLICATIONS

IEEE Std 802.11™ -2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Kwang B Yao
*Assistant Examiner* — Moo Ryong Jeong
(74) *Attorney, Agent, or Firm* — Shichrur & Co.

(57) ABSTRACT

Some demonstrative embodiments include apparatuses, devices, systems and methods of wireless communication to a plurality of wireless stations. For example, a wireless station may be configured to assign to a plurality of data units a respective plurality of increasing sequence numbers (SNs); and to transmit one or more directional transmission sequences in one or more respective directions over a directional frequency band.

25 Claims, 9 Drawing Sheets

(56) References Cited

U.S. PATENT DOCUMENTS

| | | | |
|---|---|---|---|
| 2009/0046682 A1* | 2/2009 | Kim | H04W 28/06 |
| | | | 370/338 |
| 2013/0128837 A1 | 5/2013 | Gong et al. | |
| 2013/0223210 A1* | 8/2013 | Asterjadhi | H04L 1/0025 |
| | | | 370/230 |
| 2014/0269964 A1 | 9/2014 | Du et al. | |
| 2015/0333894 A1* | 11/2015 | Wang | H04L 5/0073 |
| | | | 370/329 |

OTHER PUBLICATIONS

IEEE Std 802.11ad™ -2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2016/028565, dated Jul. 26, 2016, 9 pages.

International Preliminary Report on Patentability for PCT/US2016/028565, mailed on Dec. 7, 2017, 6 pages.

* cited by examiner

| Octets | Element ID | Length | Group addressed frames window size |
|---|---|---|---|
| | 1 | 1 | 1 |

202 — Element ID
204 — Length
206 — Group addressed frames window size
200

Fig. 2

| Bits | B0  B3 | B4  B15 |
|---|---|---|
| | Repetition Number | Sequence Number |
| | 4 | 12 |

302 — Repetition Number
304 — Sequence Number
300

Fig. 3

APPARATUS, SYSTEM AND METHOD OF WIRELESS COMMUNICATION TO A PLURALITY OF STATIONS

CROSS REFERENCE

This application claims the benefit of and priority from U.S. Provisional Patent Application No. 62/167,022 entitled "Apparatus, System, and Method of Wireless Communication to a Plurality of Stations", filed May 27, 2015, the entire disclosure of which is incorporated herein by reference.

TECHNICAL FIELD

Embodiments described herein generally relate to wireless communication to a plurality of wireless stations.

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

Some Specifications, e.g., an IEEE 802.11ad Specification, may be configured to support a Single User (SU) system, in which a Station (STA) cannot transmit frames to more than a single STA at a time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of an information element, in accordance with some demonstrative embodiments.

FIG. 3 is a schematic illustration of a sequence control field, in accordance with some demonstrative embodiments.

DETAILED DESCRIPTION

Figure 1:
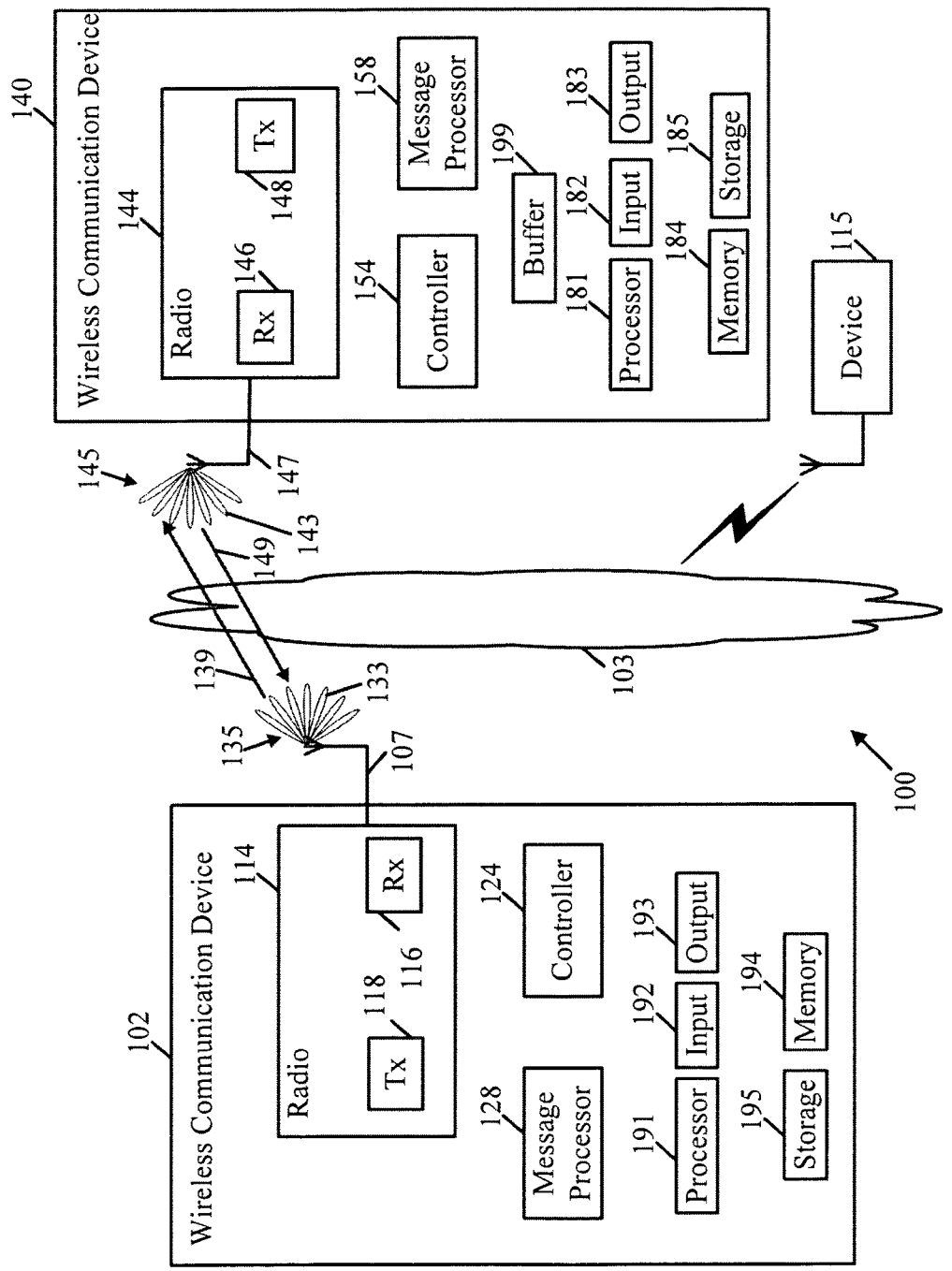
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems Local and Metropolitan Area Networks Specific Requirements—Part 11: Wireless LAN Medium Access Control (MAC) and Physical Layer (PHY) Specifications Amendment 4: Enhancements for Very High Throughput for Operation in Bands below 6 GHz*", December, 2013); *IEEE 802.11ad ("IEEE P802.11 ad-2012, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec., 2012); IEEE-802.11REVmc (*"IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"*); IEEE802.11-ay (*P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing WiFi Alliance (WFA) Peer-to-Peer (P2P) specifications (*WiFi P2P technical specification, version 1.5*, Aug. 4, 2015) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (SIG) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, 7 Gigabit per second, or any other rate.

Some demonstrative embodiments may be implemented by a DMG STA (also referred to as a "mmWave STA (mSTA)"), which may include for example, a STA having a radio, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, a wireless communication device 115, and/or one more other devices.

In some demonstrative embodiments, devices 102, 115, and/or 140 may include a mobile device or a non-mobile, e.g., a static, device.

For example, devices 102, 115, and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or devices 115 and/or 140 may include, for example, one or more of a processor 181, an input unit 182, an output unit 183, a memory unit 184, and/or a storage unit 185. Devices 102, 115, and/or 140 may optionally include other suitable hardware components and/or software components. In some demonstrative embodiments, some or all of the components of one or more of devices 102, 115, and/or 140 may be enclosed in a common housing or packaging, and may be interconnected or operably associated using one or more wired or wireless links. In other embodiments, components of one or more of devices 102, 115 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD- RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 115, and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102, 115, and/or 140 may include, operate as, and/or perform the functionality of, one or more wireless stations, e.g., as described below.

In some demonstrative embodiments, devices 102, 115, and/or 140 may include, operate as, and/or perform the functionality of, one or more DMG stations.

In other embodiments, devices 102, 115, and/or 140 may include, operate as, and/or perform the functionality of, any other wireless device and/or station, e.g., a WLAN STA, a WiFi STA, a Neighbor Awareness Networking (NAN) STA, and the like.

In some demonstrative embodiments, devices 102, 115, and/or 140 may include one or more radios including circuitry and/or logic to perform wireless communication between devices 102, 115, 140 and/or one or more other wireless communication devices. For example, device 102 may include a radio 114, and/or devices 115 and/or 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 and/or device 115 may include a single antenna 147. In another example, device 140 and/or device 115 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, e.g., via a direction 133, and/or device 140 may transmit a directional transmission 149 to device 102, e.g., via a direction 143.

In some demonstrative embodiments, device 102 may include a controller 124, and/or devices 140 and/or 115 may include a controller 154. Controllers 124 and/or 154 may be configured to perform, control, trigger and/or cause one or more communications, may generate and/or control, trigger and/or cause communication of one or more messages and/or transmissions, and/or may perform one or more functionalities, operations and/or procedures between devices 102, 115, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102, 140 and/or 115 may include, may operate as, and/or may perform the functionality of, one or more STAs. For example, device 102 may include at least one STA, device 140 may include at least one STA, and/or device 140 may include at least one STA.

In some demonstrative embodiments, devices 102, 115, and/or 140 may be configured to include, operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102, 115, and/or 140 may be configured to include, operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

Some specifications, e.g., the *IEEE* 802.11*ad*-2012 *Specification*, may be configured to support a Single User (SU) system, in which a Station (STA) cannot transmit frames to more than a single STA at a time. Such specifications may not be able, for example, to support transmission from a STA to multiple STAs, e.g., simultaneously.

In some demonstrative embodiments, devices 102, 140, and/or 115 may be configured to support transmission from a STA, e.g., a STA implemented by device 102, to multiple STAs, e.g., including a STA implemented by device 140 and/or a STA implemented by device 115, for example, using a multicast scheme, a group-addressed scheme, a multi-user MIMO (MU-MIMO) scheme, e.g., a downlink (DL) MU-MIMO, and/or any other scheme.

In some demonstrative embodiments, devices 102, 115, and/or 140 may be configured to implement one or more Multi-User (MU) mechanisms. For example, devices 102, 115, and/or 140 may be configured to implement one or more MU mechanisms, which may be configured to enable MU communication.

In some demonstrative embodiments, devices 102, 140 and/or 115 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including devices 140, 115 and/or one or more other devices.

In some demonstrative embodiments, devices 102, 115 and/or 140 may be configured to implement any other additional or alternative MU mechanism, e.g., to communicate MU transmissions, and/or any other MIMO mechanism, e.g., to communicate MIMO transmissions.

In some demonstrative embodiments, devices 102, 115, and/or 140 may be configured to communicate over a Next Generation 60 GHz (NG60) network, an Extended DMG (EDMG) network, and/or any other network and/or any other frequency band. For example, devices 102, 115, and/or 140 may be configured to communicate multicast, group addressed, and/or DL MU-MIMO transmissions, for example, for communicating over the NG60 and/or EDMG networks.

In some demonstrative embodiments, devices 102, 115 and/or 115 may communicate as part of a directive network, for example, over a directive wireless communication band, for example, a DMG band, and/or any other band.

In some demonstrative embodiments, devices 102, 115 and/or 140 may include, may operate as, and/or perform the functionality of, one or more DMG STAB. For example, device 102 may include at least one DMG STA, device 115 may include at least one DMG STA, and/or device 140 may include at least one DMG STA.

In some demonstrative embodiments, devices 102, 115 and/or 140 may be configured to communicate frames from a wireless station (also referred to as an "initiator STA"), e.g., a STA implemented by device 102, to a plurality of wireless stations, e.g., including a STA implemented by device 115, and/or a STA implemented by device 140.

In some demonstrative embodiments, device 102 may be configured to transmit one or more group addressed frames, which may be addressed to, transmitted to, and/or receivable by a plurality of wireless stations, e.g., including a STA implemented by device 115, and/or a STA implemented by device 140.

In some demonstrative embodiments, the term "group" may be used with respect to a plurality of devices, a set of devices, and/or subset of devices. In other embodiments, any other terminology may be used to refer to and/or identify the plurality of devices.

In some demonstrative embodiments, a group of devices may be, for example, collectively, commonly, and/or jointly addressed, for example, using a group address, and/or any other address, signaling, indication, and/or mechanism.

In some demonstrative embodiments, the group address may include, for example, a multicast address, a broadcast address, and/or any other address, which may be directed to, may identify, may indicate, may signal, and/or may represent, more than one station or device, and/or which indicates that a message including the group address may be directed to, received by, intended for, and/or processed by, more than one device or station. In other embodiments, any other terminology may be used to refer to the frame.

In some demonstrative embodiments, a group address may include, for example, a medium access control (MAC) address, which may have an indicator, e.g., a group bit, set to a predefined value, e.g., equal to 1, or any other value and/or format.

In some demonstrative embodiments, a group addressed data unit, for example, a message, a frame, and/or a packet, may include a data unit, which includes a field including a group address.

In one example a group addressed MAC service data unit (MSDU) may include an MSDU, which includes a group address as a destination address (DA) or Receive Address (RA).

In another example, a group addressed MAC protocol data unit (MPDU) may include an MPDU with a group address in an address field.

In some demonstrative embodiments, the group address may include, for example, a multicast group address. In one example, the multicast group address may include a MAC address associated by higher-level convention with a group of logically related stations. The multicast address may be defined, configured and/or determined according to any other mechanism.

In some demonstrative embodiments, the group address may include, for example, a broadcast address. For example, the broadcast address may include a group address, e.g., a unique group address, which may specify all stations (STAs).

In some demonstrative embodiments, there may be a need to address a problem of delivering group addressed frames to a plurality of stations in a directive network, e.g., over a DMG band, for example, at least since the directive network may use a beam formed link to deliver frames between interacting stations.

In one example, a solution based on an attempt to cover all of the plurality of stations by a single transmission may be based on a general assumption for networks based on carrier sense multiple access with collision avoidance approach. Such a solution may not be suitable for the directive network, e.g., due to the nature of signal propagation over a directive channel.

In another example, a solution based on an attempt to substitute transmission of group-addressed frames with multiple transmissions of unicast frames may require a large number of transmissions, e.g., as many transmissions as the number of stations to be covered. Accordingly, this solution may be excessive, e.g., even in directive networks. For example, in some scenarios, deployments and/or use cases, for example, when more than one station may be covered by a single transmission, all stations may be covered by a number of transmissions, which may be fewer than the number of stations, e.g., in opposed to requiring a one-to-one relationship between the number of stations to be covered and the number of transmissions. Accordingly, sending group addressed frames multiple times may result in a station receiving multiple copies of the same frame. Currently, there is no known solution to efficiently handle multiple duplicates of group-addressed frames, e.g., to enable a station to detect duplicates of group-addressed frames.

In some demonstrative embodiments, devices 102, 115 and/or 140 may be configured to communicate one or more transmissions, e.g., one or multiple transmissions, of one or more sequences of group addressed frames, for example, from a wireless station ("initiator" or ""transmitter"), e.g., device 102, to a plurality of wireless stations ("receiver stations", or "receivers"), e.g., including devices 115 and/or 140.

In some demonstrative embodiments, a wireless station, e.g., device 102, may be configured to generate and/or process transmission, e.g., directional transmission, of a sequence of group addressed frames to a plurality of wireless stations, for example, over a directional frequency band, e.g., as described below.

In some demonstrative embodiments, the directional frequency band may include a DMG frequency band, a mmWave frequency band, an EDMG frequency band, and/or a NG60 frequency band. In other embodiments, the directional frequency band may include any other additional or alternative frequency band.

In some demonstrative embodiments, a group-addressed frame of the sequence of group address frames may include a Receive Address (RA) set to include a group address, which may be assigned to the group of the plurality of stations.

In some demonstrative embodiments, a wireless station, e.g., device 115 and/or device 140, may be configured to process reception of one or more, e.g., some or all of, the sequence of group addressed frames, e.g., as described below.

In some demonstrative embodiments, a wireless station, e.g., device 102, may be configured to transmit the sequence of group-addressed frames one or more times, for example, multiple times, e.g., as described below.

In some demonstrative embodiments, a wireless station, e.g., device 102, may be configured to repeat transmission of the sequence of group-addressed frames, for example, by transmitting a sequence, e.g., each sequence, in a different direction, for example, to cover an area, e.g., an entire area, of associated stations, e.g., of the plurality of stations to receive the group-addressed frames.

In some demonstrative embodiments, a limit of consequently sent group addressed frames (also referred to as "group addressed frames window size") may be, for example, predefined, preset, and/or configured, for example, by a control station, e.g., as described below.

In some demonstrative embodiments, the limit of consequently sent group addressed frames may be, for example, communicated, e.g., by the control station, among a plurality of wireless stations, for example, all members of a service set.

In some demonstrative embodiments, a wireless station, e.g., each station of a group of stations, for example, devices 115 and/or 140, may be configured to allocate a receiving buffer to collect the limit of group addressed frames per transmitter, e.g., device 102, for example, according to the limit of consequently sent group addressed frames, e.g., as described below. For example, device 140 may include a buffer 199, which may be configured to buffer group addressed frames received by device 140, for example, before the group address frames are provided for further processing, e.g., by a higher layer.

In some demonstrative embodiments, device 140 may be configured to use buffer 199, for example, for reordering and/or for duplicate detection of the received frames, e.g., as described below.

In some demonstrative embodiments, a wireless station transmitting a group addressed frame, e.g., device 102, may be configured to include in the group addressed frame at least a countdown Repetition Number (RN), and/or a Sequence Number (SN), e.g., as described below.

In some demonstrative embodiments, the countdown RN and/or the SN may be included, for example, in a Sequence control field of the group addressed frame, e.g., as described below. In other embodiments, an indication of the countdown RN and/or the SN may be included as part of any other field, attribute, and/or information element.

In some demonstrative embodiments, an initiator of a transmission of group addressed frames, e.g., device 102, may be configured to allocate a separate sequence number (SN) counter, which may be incremented, for example, with each newly transmitted group addressed frame. In one example, the initiator may allocate a single SN counter, e.g., for all groups.

In some demonstrative embodiments, the initiator, e.g., device 102, may be configured to transmit a sequence of group-addressed frames one or multiple times, for example, while keeping the same SNs. For example, the initiator, e.g., device 102, may be configured to repeat the transmission of the sequence of group-addressed frames, e.g., each time in a different direction, as described below.

In some demonstrative embodiments, the number of repetitions of the transmissions of the sequence of group addressed frames may be configured, for example, to cover an area, e.g., an entire area, of associated stations, e.g., to which the sequence of group addressed frames is to be transmitted.

In some demonstrative embodiments, the initiator, e.g., device 102, may be configured to set the RN to include a remainder of repetitions, e.g., a number of remaining repetitions, and may decrement the RN, for example, each time the sequence is repeated, e.g., as described below.

In some demonstrative embodiments, the initiator, e.g., device 102, may be configured to set the RN in a group-addressed frame, for example, to indicate to a receiver of the group-addressed frame, e.g., device 115 and/or device 140, a number of remaining repetitions of the transmission of the group addressed frame, to indicate when no more copies of the group addressed frame are expected, and/or to indicate that the receiver buffer should be released, for example, in order of SNs, e.g., as described below.

In some demonstrative embodiments, devices 102, 115 and/or 140 may be configured to communicate a group addressed block acknowledgement request (BAR) frame, which may be configured, for example, at least to control delivery of the group addressed frames, e.g., as described below.

In some demonstrative embodiments, the initiator, e.g., device 102, may be configured to send a BAR frame, for example, by control PHY modulation, for example, as part of a transmission sequence including the sequence of group-addressed frames. For example, the initiator, e.g., device 102, may be configured to send a BAR frame, for example, at a beginning and/or an end of each sequence in each direction, for example, when sending the group addressed frames in the DMG network.

In some demonstrative embodiments, the initiator, e.g., device 102, may be configured to set a receive address (RA) field of the BAR frame, for example, to a group address, e.g., which may be assigned to the plurality of stations to receive the group-addressed frames.

In some demonstrative embodiments, the initiator, e.g., device 102, may be configured to set a transmit address (TA) of the BAR frame, for example, to indicate a direction in which the receiving stations, e.g., devices 115 and/or 140, should configure their receiving antennas, e.g., as described below.

In some demonstrative embodiments, the transmit address of the BAR frame may include an address of the transmitting STA, e.g., device 102, for example, to identify to a receiving STA, e.g., device 115 and/or device 140, a direction in which the receiving antennas of the receiving STA shall be set to receive the group addressed data frames.

In some demonstrative embodiments, a directed antenna at the receiver may enable using of a higher modulation and coding scheme (MCS) and/or MPDUs aggregation for transmission of group addressed frames.

In some demonstrative embodiments, the initiator, e.g., device 102, may be configured to set the RN and SN of the BAR frame, for example, to force release of the received frames from the receiving buffer, for example, to further processing by a higher level, e.g., as described below.

In some demonstrative embodiments, devices 102, 115 and/or 140 may be configured to perform communication of group addressed frames according to one or more procedures, methods, operations processes, and/or phases, e.g., as described below.

In some demonstrative embodiments, a window size (also referred to as "group addressed frames window size") may be set and/or defined, for example in a first phase ("phase one"), e.g., as described below.

In some demonstrative embodiments, devices 102, 115 and/or 140 may be configured to communicate group-addressed frames, for example, in a second phase ("phase 2"), for example, following the first phase, e.g., as described below.

In other embodiments, only one of the first and second phases may be performed, for example, with or without one or more other additional or alternative operations, phases and/or procedures.

In some demonstrative embodiments, the group addressed frames window size may be generated and/or set by a STA, for example, network controller and/or coordinator, for example, by a PCP STA and/or an AP STA, e.g., as described below.

In other embodiments, the group addressed frames window size may be generated and/or set by any other station, for example, by a non-PCP or non-Access Point (AP) station (non-PCP/AP STA).

In one example, one of devices 102, 115 and/or 140 may operate as a PCP STA, which may be configured to set the group addressed frames window size, for example, to be used by station within a PBSS.

In one example, one of devices 102, 115 and/or 140 may operate as an AP STA, which may be configured to set the group addressed frames window size, for example, to be used by station within a BSS.

In some demonstrative embodiments, a wireless station, for example, a non-AP/non-PCP STA, e.g., one of devices 102, 140 and/or 115, may be configured to receive an indication of the group addressed frames window size, for example, from the PCP/AP STA.

In some demonstrative embodiments, the PCP/AP STA may be configured to include the indication of the group addressed frames window size, for example, in an association response frame, and/or any other frame.

In some demonstrative embodiments, an information element, attribute, message, and/or a field, for example, a new or adjusted information element, may be configured to communicate the indication of the group addressed frames window size, e.g., as described below.

Reference is made to FIG. 2, which schematically illustrates an information element 200 including a group addressed frames window size, in accordance with some demonstrative embodiments. For example, a first device, for example, a PCP/AP STA, e.g., device 102 (FIG. 1), may be configured to generate and/or transmit information element 200; an/or a second device, for example, a non-PCP/AP STA, e.g., device 140 (FIG. 1) and/or device 150 (FIG. 1), may be configured to receive, access and/or process information element 200.

In some demonstrative embodiments, information element 200 may be included, for example, as part of a frame, for example, a management frame, a control frame, and/or any other frame. In one example, information element 200 may be included in an association response frame.

In some demonstrative embodiments, information element 200 may include an element identifier 202, for example, including a value to indicate a type of information element 200, for example, a an IE type configured to include the group addressed frames window size.

In some demonstrative embodiments, information element 200 may include a length field 204, for example, including a value to indicate a length of information element 200.

In some demonstrative embodiments, information element 200 may include a field ("Group addressed frames window size") 206 configured to include a value to indicate the group addressed frames window size.

In some demonstrative embodiments, the group addressed frames window size may indicate a limit of consequently sent group addressed frames. For example, a control STA, e.g., device 102 (FIG. 1) may configured the value of the group addressed frames window size to indicate to one or more STAs, e.g., devices 115 and/or 140 (FIG. 1), a size of buffer 199 (FIG. 1) to be allocated for buffering received group addressed frames.

In one example, device 140 (FIG. 1) may receive information element 200, and controller 154 (FIG. 1) may allocate a size of buffer 199 (FIG. 1) to collect group addressed frames per transmitter, e.g., device 102 (FIG. 1), for example, based on the group addressed frames window size 206.

In some demonstrative embodiments, a value in the Group addressed frames window size 206 may indicate the window size, for example, in units of a MAC protocol data unit (MPDU), and/or any other units.

Reference is made to FIG. 3, which schematically illustrates a sequence control field 300, in accordance with some demonstrative embodiments. For example, a first device, for example, device 102 (FIG. 1), may be configured to generate and/or transmit a message including sequence control field 300; an/or a second device, for example, device 140 (FIG. 1) and/or device 150 (FIG. 1), may be configured to receive, access and/or process the message including sequence control field 300.

In some demonstrative embodiments, a device, e.g., device 102 (FIG. 1), may be configured to generate sequence control field 300 configured to indicate a Repetition Number (RN), e.g., in a field 302, and a Sequence Number (SN), e.g., in a field 304.

In some demonstrative embodiments, sequence control field 300 may be included as part of a Sequence Control (SC) field, for example, of a data frame.

For example, sequence control field 300 may be included as part of a Sequence Control (SC) field of a group-addressed data frame of a sequence of a plurality of group-addressed frames, e.g., as described below.

In one example, a Fragment Number (FN) in the SC field may be configured to include sequence control field 300.

In some demonstrative embodiments, sequence control field 300 may be included as part of a Starting Sequence Control (SSC) subfield, e.g., of a block acknowledgement request (BAR) frame.

For example, sequence control field 300 may be included as part of a Starting Sequence Control (SSC) subfield of a BAR in a transmission sequence including the sequence of group-addressed frames, e.g., as described below.

In one example, a Fragment Number (FN) in the SSC subfield may be configured to include sequence control field 300.

In other embodiments, sequence control field 300 may be included as part of any other filed of any other message and/or frame.

Referring back to FIG. 1, in some demonstrative embodiments, controller 124 may be configured to trigger, cause, control and/or instruct a wireless station implemented by device 102 to transmit a plurality of data units to a group of stations, e.g., including one or more stations implemented by devices 140 and/or 115, for example, via group addressed frames, e.g., as described below.

In some demonstrative embodiments, controller 124 may be configured to trigger, cause, control and/or instruct the wireless station implemented by device 102 to assign to the plurality of data units a respective plurality of increasing sequence numbers (SNs), e.g., as described below.

In some demonstrative embodiments, controller 124 may be configured to trigger, cause, control and/or instruct the wireless station implemented by device 102 to transmit one or more directional transmission sequences in one or more respective directions over a directional frequency band, e.g., as described below.

In some demonstrative embodiments, a directional transmission sequence of the one or more directional transmission sequences may include, for example, a block acknowledgement request (BAR) addressed to the group of stations, and a sequence of a plurality of group addressed frames addressed to the group of stations, e.g., as described below.

In some demonstrative embodiments, a frame of the plurality of group addressed frames may include, for example, a respective data unit of the plurality of data units, a SN corresponding to the data unit, and a repetition number (RN) configured to indicate a remaining number of the one or more directional transmission sequences, e.g., as described below.

In some demonstrative embodiments, controller 124 may be configured to trigger, cause, control and/or instruct the wireless station implemented by device 102 to limit a number of frames in the plurality of group addressed frames, for example, based on a window size, e.g., the group addressed frames window size, which may be determined, set, configured and/or published by a control station, e.g., a PCP/AP STA and/or any other control station, e.g., as described above.

In some demonstrative embodiments, the BAR included in the directional transmission sequence may include, for example, the RN, which is included in group addressed frames of the directional transmission sequence.

In some demonstrative embodiments, the BAR included in the directional transmission sequence may include, for example, a Transmit Address (TA) field, which may be set to include an address of the wireless station transmitting the group addressed frames, e.g., the wireless station implemented by device 102, e.g., as described below.

In some demonstrative embodiments, the BAR included in the directional transmission sequence may include, for example, a highest SN transmitted before the BAR, for example, in a same direction of the BAR, e.g., as described below. For example, the indication of the highest SN transmitted before the BAR may enable a receiver of the group addressed frames, e.g., device 140 and/or device 115, to reorder the group addressed frames, e.g., as described below.

In some demonstrative embodiments, controller 124 may be configured to trigger, cause, control and/or instruct the wireless station implemented by device 102 to transmit the BAR prior to the sequence of the plurality of group addressed frames of the directional transmission sequence, e.g., as described below.

In some demonstrative embodiments, controller 124 may be configured to trigger, cause, control and/or instruct the wireless station implemented by device 102 to transmit the BAR after to the sequence of the plurality of group addressed frames of the directional transmission sequence, e.g., as described below.

In some demonstrative embodiments, controller 124 may be configured to trigger, cause, control and/or instruct the wireless station implemented by device 102 to reserve a wireless medium, e.g., wireless medium 103, for example, at least for a duration of the directional transmission sequence, e.g., as described below.

In some demonstrative embodiments, controller 124 may be configured to trigger, cause, control and/or instruct the wireless station implemented by device 102 to transmit a reservation frame, for example, a Self-Clear-To-Send (Self-CTS) frame and/or any other frame or message, for example, at the beginning of the directional transmission sequence, e.g., as described below.

In some demonstrative embodiments, controller 124 may be configured to trigger, cause, control and/or instruct the wireless station implemented by device 102 to transmit a plurality of directional transmission sequences in a respective plurality of directions, e.g., as described below.

In some demonstrative embodiments, for example, a directional transmission sequence of the plurality of directional transmission sequences, e.g., each directional transmission sequence of the plurality of directional transmission sequences, may include a repetition of the plurality of data units, e.g., as described below.

In some demonstrative embodiments, controller 124 may be configured to determine the plurality of directions, for example, based on a directionality and/or a location of one or more stations in the group of stations, e.g., as described below.

In some demonstrative embodiments, controller 124 may be configured to determine the plurality of directions, for example, to include at least a first direction and a second direction. For example, controller 124 may configure the first direction to cover at least one first station of the group of stations, and/or controller 124 may configure the second direction to cover at least one second station of the group of stations, e.g., as described below.

Figure 4:
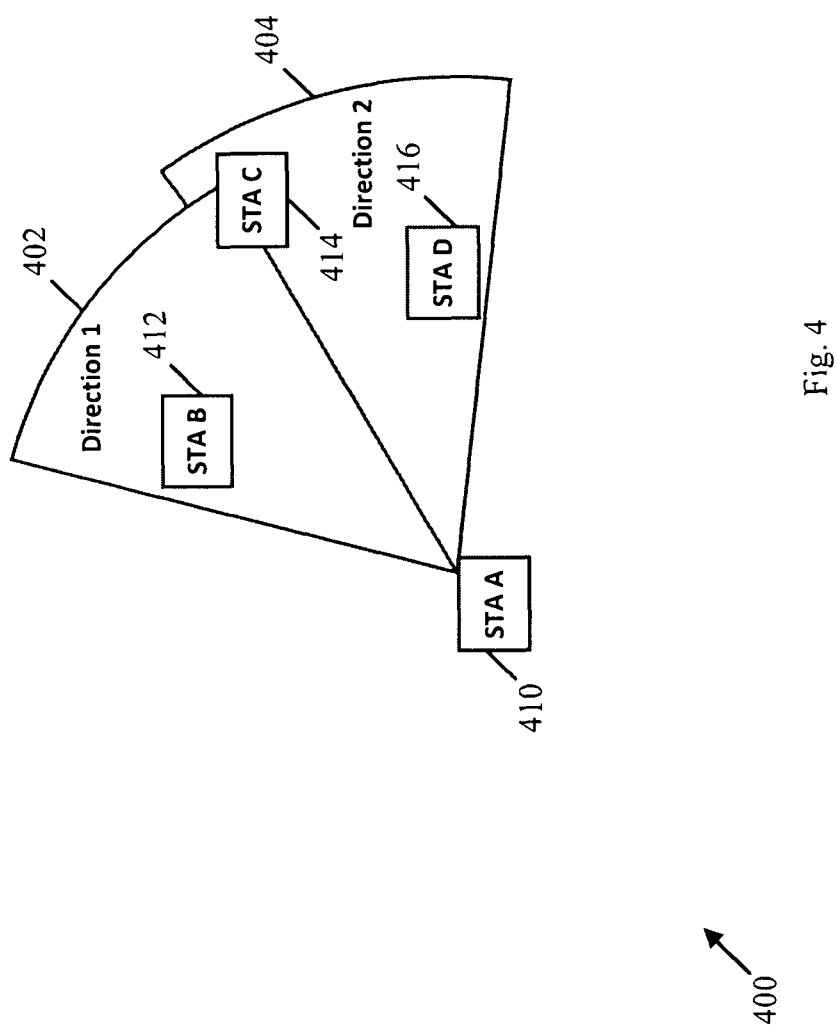
FIG. 4 is a schematic illustration of a network topology, in accordance with some demonstrative embodiments.

Reference is made to FIG. 4, which schematically illustrates a network topology 400, in accordance with some demonstrative embodiments.

In some demonstrative embodiments, as shown in FIG. 4, a plurality of stations, e.g., including station A (STA A) 410, station B (STA B) 412, station C (STA C) 414, and station D (STA D) 416, may belong to the same PBSS.

In one example, device 102 (FIG. 1) may operate as the station A 410, device 140 (FIG. 1) may operate as one of STAs 412, 414, and 416, e.g., STA 412, and/or device 115 (FIG. 1) may operate as another one of STAs 412, 414, and 416, e.g., STA 414.

In some demonstrative embodiments, as shown in FIG. 4, the STA 410 may deliver group addressed frames to the STAs 412, 414, and/or 416.

In some demonstrative embodiments, as shown in FIG. 4, STA 410 may transmit in two directions, for example, in a direction ("Direction 1") 402 followed by a direction 404 ("Direction 2"), e.g., to cover all stations B, C, and D.

For example, controller 124 (FIG. 1) may be configured to trigger, cause, control and/or instruct the wireless station implemented by device 102 (FIG. 1) to transmit a first directional transmission sequence in the direction 402, followed by a second directional transmission sequence in the direction 404.

In some demonstrative embodiments, as shown in FIG. 4, transmit sectors of the directions 402 and 404 may slightly overlap. As a result, the station 414 may be able to receive frames sent in both the directions 402 and 404, for example, group-addressed frames of the first directional transmission sequence and/or group-addressed frames of the second directional transmission sequence. The stations 412 and/or 416 may likely receive the group-addressed frames only once. For example, station 412 may be able to receive group-addressed frames of the first directional transmission sequence, and/or station 416 may be able to receive group-addressed frames of the second directional transmission sequence.

In some demonstrative embodiments, controller 124 (FIG. 1) may be configured to trigger, cause, control and/or instruct the wireless station implemented by device 102 (FIG. 1) to transmit a first BAR in the first directional transmission sequence, to transmit a second BAR in the second directional transmission sequence, and to include a SN and a RN in the group-addressed frames of the first and second directional transmission sequences, for example, to enable the stations 412, 414, and/or 416 to reorder received group-addressed frames, and/or to detect duplicate received group-address frames, e.g., as described below.

Referring back to FIG. 1, in some demonstrative embodiments, controller 154 may be configured to trigger, cause, control and/or instruct a wireless station implemented by device 140 to process reception of a plurality of frames from a transmitter station, e.g., the plurality of frames transmitted by device 102, via at least one direction of a directional frequency band, e.g., as described above.

In some demonstrative embodiments, a frame of the plurality of frames may include a data unit, a serial number (SN) corresponding to the data unit, and a repetition number (RN) to indicate a number of remaining repeated transmissions of the data unit, e.g., as described above.

In some demonstrative embodiments, controller 154 may be configured to trigger, cause, control and/or instruct a wireless station implemented by device 140 to process reception of at least one Block Acknowledgement Request (BAR) frame from the transmitter station, e.g., at least one of the BARs transmitted by device 102, as described above.

In some demonstrative embodiments, the BAR may include a Transmit Address (TA) field including an address of the transmitter station, e.g., the address of device 102, as described above.

In some demonstrative embodiments, controller 154 may be configured to trigger, cause, control and/or instruct a wireless station implemented by device 140 to determine a directionality to receive the plurality of frames from the transmitter station, for example, based on a Transmit Address (TA) field of a BAR, for example, received prior to the plurality of frames, e.g., as described above.

In some demonstrative embodiments, controller 154 may be configured to trigger, cause, control and/or instruct a wireless station implemented by device 140 to process the plurality of frames based on a RN value and a SN value included in the BAR, e.g., as described below.

In some demonstrative embodiments, controller 154 may be configured to trigger, cause, control and/or instruct a wireless station implemented by device 140 to buffer data units of the plurality of frames, e.g., in buffer 199.

In some demonstrative embodiments, controller 154 may be configured to trigger, cause, control and/or instruct a wireless station implemented by device 140 to determine a size of the buffer 199, for example, based on a window size published by a control station, for example, the window size in information element 200 (FIG. 2), e.g., as described above.

In some demonstrative embodiments, controller 154 may be configured to trigger, cause, control and/or instruct a wireless station implemented by device 140 to selectively release the data units from the buffer for processing, for example, based at least on the RN value and the SN value of the BAR, e.g., as described below.

In some demonstrative embodiments, the BAR may include a highest SN transmitted from the transmitter station before the BAR in a direction of the BAR, e.g., as described above. For example, the highest SN may indicate if and which data units are to be provided from buffer 199 for further processing, e.g., as described below.

Figure 5:
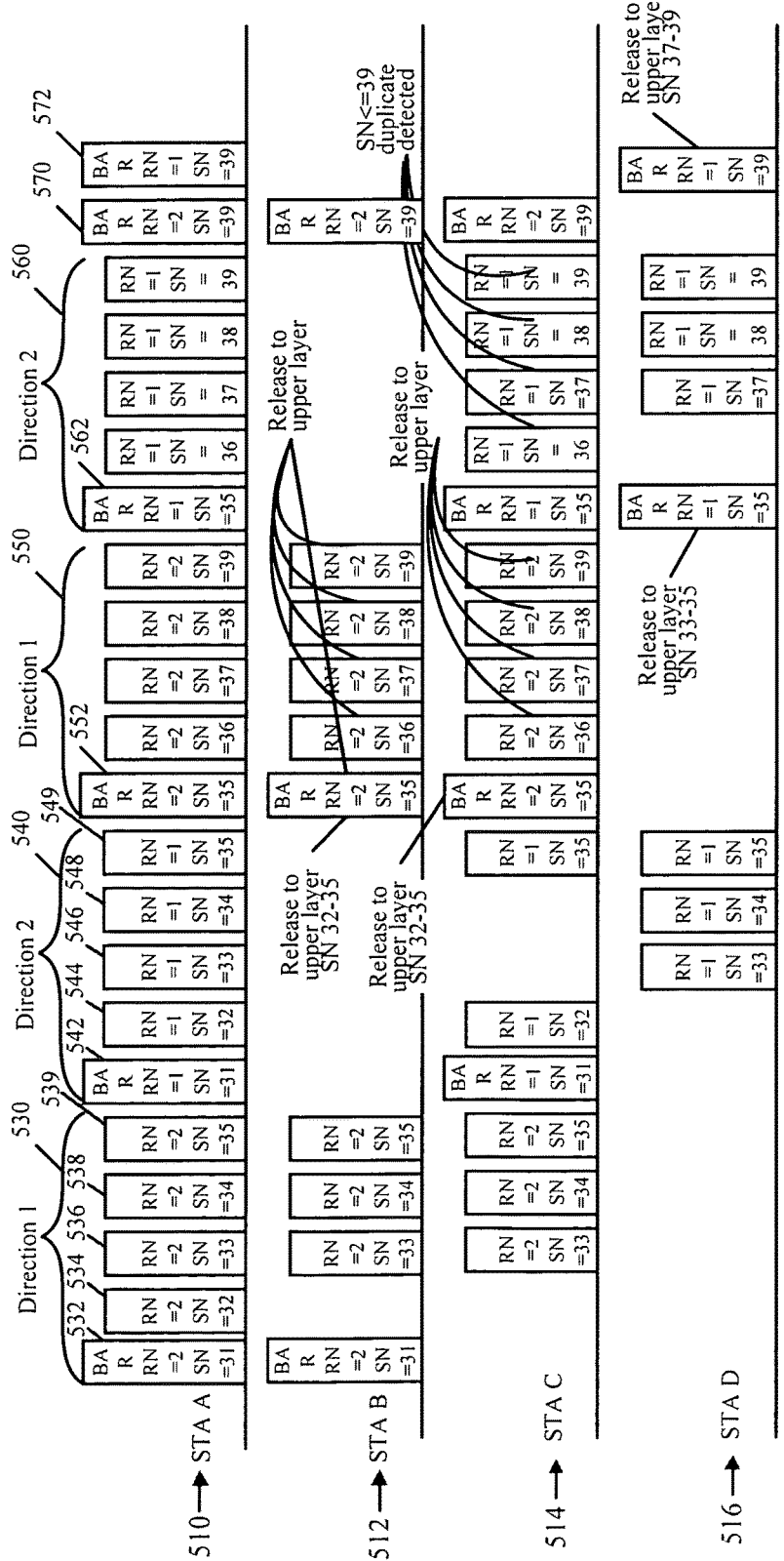
FIG. 5 is a schematic illustration of a transmit sequence of group addressed frames communicated from a wireless station to three other wireless stations, in accordance with some demonstrative embodiments.

Reference is made to FIG. 5, which schematically illustrates frames communicated between a wireless station (STA A) 510 and three other wireless stations, e.g., including a station (STA B) 512, a station (STA C) 514, and a station (STA D) 516, in accordance with some demonstrative embodiments. For example, the station 510 may include station 410 (FIG. 4), the station 512 may include station 412

(FIG. 4), the station 514 may include station 414 (FIG. 4), and/or the station 516 may include station 416 (FIG. 4).

In some demonstrative embodiments, as shown in FIG. 5, station 510 may transmit a directional transmission sequence including a BAR followed by four data frames in a sequence.

In some demonstrative embodiments, as shown in FIG. 5, station 510 may transmit each transmission sequence in two directions, e.g., the directions 402 and 404 (FIG. 4).

In some demonstrative embodiments, station 510 may transmit a first directional transmission sequence 530 in a first direction, e.g., the direction 402 (FIG. 4), followed by a second directional transmission sequence 540 in a second direction, e.g., the direction 404 (FIG. 4).

In some demonstrative embodiments, first directional transmission sequence 530 may include a BAR 532 followed by four group addressed data frames 534, 536, 538, and 539.

In some demonstrative embodiments, the group addressed data frames 534, 536, 538, and 539 may include four respective data units. The four data units may be assigned a respective sequence of four SNs, e.g., the SN=32, SN=33, SN=34, and SN=35.

In some demonstrative embodiments, second directional transmission sequence 540 may include a BAR 542 followed by four group addressed data frames 544, 546, 548, and 549.

In some demonstrative embodiments, the group addressed data frames 534, 536, 538, and 539 may include a repetition of the four respective data units of the first directional transmission sequence 530. For example, as shown in FIG. 5, the SNs may be repeated in each of the directions 1 and 2. For example, group addressed data frames 544, 546, 548, and 549 may include the data units having the SN=32, SN=33, SN=34, and SN=35, respectively.

In some demonstrative embodiments, the group addressed data frames 534, 536, 538, and 539 may include the repetition number RN=2, for example, to indicate that the frames of the transmission sequence 530 will be sent once more, e.g., in the direction 2.

In some demonstrative embodiments, the group addressed data frames 544, 546, 548, and 549 may include the repetition number RN=1 may indicate that it is the last time these frames are being sent.

In some demonstrative embodiments, as shown in FIG. 5, a BAR, e.g., the BAR 532 and/or the BAR 542, may include a highest SN transmitted before the BAR, e.g., in the direction of transmission of the BAR.

In one example, the BAR 532 and the BAR 542 may include the SN=31, which may indicate that following data frames will start with and SN=32

In another example, a BAR 552 in a transmission sequence 550 and a BAR 562 in a transmission sequence 560 may include the SN=35, which is the highest SN transmitted in the transmission sequences 530 and 540.

In some demonstrative embodiments, station 510 may transmit two repetitions of one or more additional sequences of frames. For example, as shown in FIG. 5, station 510 may transmit another directional transmission sequence 550 in the first direction, e.g., the direction 402 (FIG. 4), including data frames with data units having the SN=36, SN=37, SN=38, and SN=39; followed by another directional transmission sequence 560 in the second direction, e.g., the direction 404 (FIG. 4), with data frames including a repetition of the data units with the SN=36, SN=37, SN=38, and SN=39.

In some demonstrative embodiments, as shown in FIG. 5, station 510 may be configured to send a BAR, for example, at an end of a transmit opportunity (TXOP), for example, in each of the first and second directions, e.g., to reset receiving buffers in the receiving STAs.

For example, station 510 may transmit a BAR 570 in the first direction, followed by a BAR 572 in the second direction.

In some demonstrative embodiments, as shown in FIG. 5, the BAR 570 may include a highest SN, e.g., SN=39, transmitted before the BAR 570, e.g., in the direction of transmission of the BAR 570.

In some demonstrative embodiments, as shown in FIG. 5, the BAR 572 may include a highest SN, e.g., SN=39, transmitted before the BAR 572, e.g., in the direction of transmission of the BAR 572.

In some demonstrative embodiments, as shown in FIG. 5, there may be different cases of successful frame delivery, for example, at the stations 512, 514 and/or 516, e.g., as described below.

In some demonstrative embodiments, as shown in FIG. 5, the station 512 may successfully receive the BAR (SN=31), and the sequence of frames in the first direction (RN=2, SN=33-SN=35), while one frame (SN=32) may not be successfully received by station 512, e.g., the frame (SN=32) may be lost.

In some demonstrative embodiments, the station 512 may determine, e.g., based on the repetition number RN=2, that the lost frame will be transmitted once again. Accordingly, the station 512 may expect to attempt and receive the lost frame, e.g., at the next time it is sent.

In some demonstrative embodiments, upon receiving the BAR 552 with (RN=2, SN=35), the station 512 may conclude that no more frames with SN<35 may arrive, e.g., at a later time. Accordingly, the station 512 may be able to release received frames (SN=33-SN=35) to be processed by a higher level. In another example, station 512 may release the frames (SN=36-SN=39) to the upper layer at arrival, for example, if these frames are received in uninterrupted sequence of increasing numbers.

In some demonstrative embodiments, as shown in FIG. 5, the station 514 may successfully receive the frames (RN=2, SN=33-SN=35) of the sequence, while station 514 may not successfully receive the BAR 532 with (RN=2, SN=31). The station 514 may also successfully receive the BAR 542 with (RN=1, SN=31), followed by the data frames (RN=1, SN=32) and (RN-1, SN=35).

In some demonstrative embodiments, as shown in FIG. 5, the station 514 may not be aware of the number of frames in the sequence, for example, until the station 514 receives the BAR 552 with (RN=2, SN=35), e.g., since the station 514 did not receive the BAR 532 with (RN=2, SN=31).

In some demonstrative embodiments, the station 514 may determine, for example, based on the successfully received BAR 552 with (RN=2, SN=35), that the frame (RN=1, SN=32) arrived just after BAR 542 with (RN=1, SN=31). This may indicate that the entire sequence of data units (SN=32-SN=35) may be already constructed in the buffer 199 (FIG. 1), e.g., from frames with the RN=2 and the RN=1. Accordingly, station 514 may be able to release the sequence of frames (SN=32-SN=35) to the upper layer.

In some demonstrative embodiments, the station 514 may release the frames (RN=2, SN=36-SN=39) to the upper layer at arrival, for example, if these frames are received in an uninterrupted sequence of increasing numbers.

In some demonstrative embodiments, the station 514 may detect all frames (RN=1, SN=36-SN=39) as being duplicates, for example, because the frames with the SN<=39 were already previously received. Therefore, the station 514 may reject the frames with (RN=1, SN=36-SN=39).

In some demonstrative embodiments, as shown in FIG. 5, the station 516 may successfully receive the frames with (RN=1, SN=33-SN=35), for example, while not receiving the BAR 532, and without receiving the BAR 542.

In some demonstrative embodiments, as shown in FIG. 5, the station 516 may be able to release received frames with (RN=1, SN=33-SN=35), for example, at arrival of the BAR 562 with (RN=1, SN=35), for example, since the value of RN=1, which indicates a last try, may indicate that no more frames with earlier sequence numbers can be expected.

In some demonstrative embodiments, in a similar manner, at arrival of the BAR 572 with (RN=1, SN=39), the station 516 may determine that the frames with (SN=37-SN=39) may be released. However there may be a "hole" in the SNs, e.g., since the frame with SN=36 may be missing.

Referring back to FIG. 1, in some demonstrative embodiments devices 102, 140 and/or 115 may be configured to utilize a bit (also referred to as "More Data bit"), which may be configured to distinguish single group addressed frames from a stream of group addressed frames. For example, using the More data bit may enable, for example, fast release of one or more frames from receive buffer 199.

In some demonstrative embodiments, a transmitter device, e.g., device 102, may set the More Data bit to a first predefined value, e.g., "1", for example, if more frames are buffered for transmission with the same group receiving address; and/or the transmitter device may set the More Data bit to another value, e.g., "0" or the transmitter device may select not be set More Data bit to the "1", for example, if no more frames are buffered for transmission with the same group receiving address.

In some demonstrative embodiments, a BAR may be transmitted before a sequence of group-addressed frames, e.g., as described above with reference to FIG. 5.

In some demonstrative embodiments, a BAR frame may be transmitted at any other timing, for example, after a sequence of group addressed frames, e.g., at an end of each sequence of group addressed frames.

Figure 6:
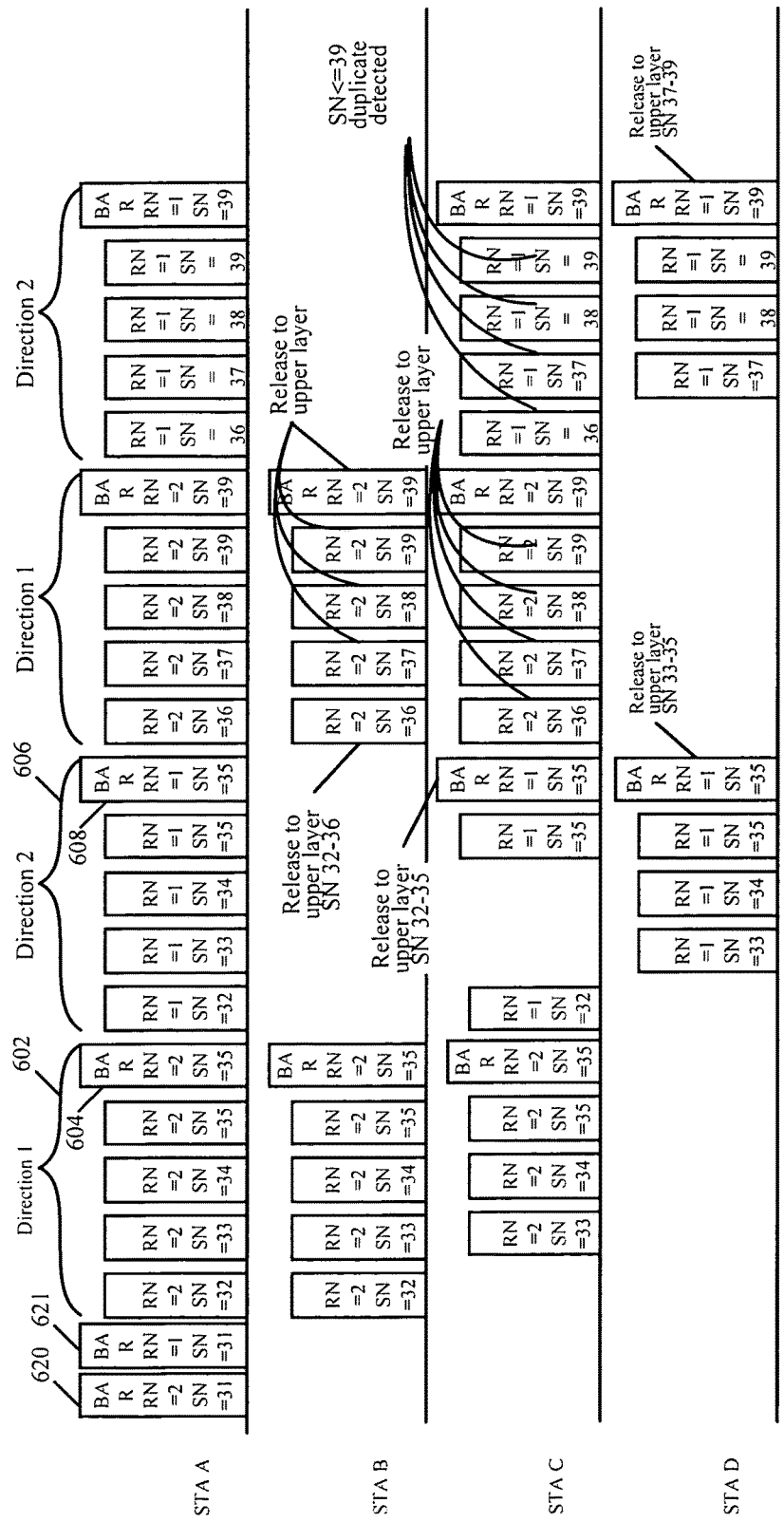
FIG. 6 is a schematic illustration of a transmit sequence of group addressed frames communicated from a wireless station to three other wireless stations, in accordance with some demonstrative embodiments.

Reference is made to FIG. 6, which schematically illustrates frames communicated between a wireless station (STA A) and three other wireless stations, e.g., including a station (STA B), a station (STA C), and a station (STA D), in accordance with some demonstrative embodiments.

In some demonstrative embodiments, as shown in FIG. 6, the wireless STA (STA A), e.g., device 102 (FIG. 1), may transmit a sequence of group addressed frames followed by a BAR, e.g., including the SN of the last data from of the sequence of group addressed frames. For example, as shown in FIG. 6, the STA A may transmit a transmission sequence 602 including a sequence of frames with (RN=2, SN=32-SN=35), followed by a BAR 604 with (RN=2, SN=35); and/or a transmission sequence 606 including a sequence of frames with (RN=1, SN=32-SN=35), followed by a BAR 608 with (RN=1, SN=35).

In some demonstrative embodiments, as shown in FIG. 6, the STA A, e.g., device 102 (FIG. 1), may be configured to transmit a BAR 620 and/or a BAR 621 before the transmission sequences 602 and 606.

For example, the STA A, e.g., device 102 (FIG. 1), may be configured to transmit BAR 620 in a first direction, e.g., a direction 402, of the transmission sequence 602; and/or to transmit BAR 621 in a second direction, e.g., a direction 404, of the transmission sequence 606.

In some demonstrative embodiments, the BARs 620 and/or 621 may include the SN=31, e.g., to indicate a highest SN of a previously transmitted data unit.

In some demonstrative embodiments, the BARs 620 and/or 621 may include the TA filed including the address of the STA A, e.g., to indicate to a receiver station, e.g., device 140 (FIG. 1), a direction for receiving the transmission sequences 602 and/or 606, e.g., as described above.

Referring back to FIG. 1, in some demonstrative embodiments, the initiator of the group-addressed transmission, e.g., device 102, may be configured to reserve the wireless medium, e.g., at least for a duration of the group-addressed transmission.

In some demonstrative embodiments, the initiator may use a Self Clear-to-Send (Self-CTS) frame to reserve the medium, e.g., as described below. In other embodiments, any other frame and/or mechanism may be used.

Figure 7:
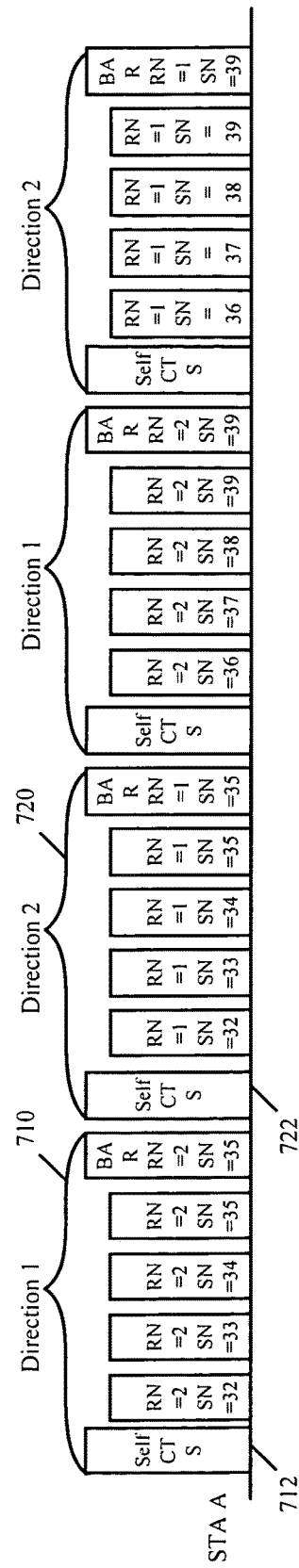
FIG. 7 is a schematic illustration of a Self Clear-to-Send (Self-CTS) frame communicated prior to a sequence of group-addressed frames, in accordance with some demonstrative embodiments.

Reference is made to FIG. 7, which schematically illustrates a Self-CTS frame flowed by a sequence group addressed frames, in accordance with some demonstrative embodiments.

In some demonstrative embodiments, as shown in FIG. 7, a wireless STA (STA A), e.g., device 102 (FIG. 1), may transmit a first Self-CTS frame 712 in the Direction 1, for example, at a beginning of a first transmission sequence 710. The Self-CTS frame 702 may be followed, for example, by a transmission of a sequence of group-addressed frames and a BAR in the Direction 1.

In some demonstrative embodiments, as shown in FIG. 7, the STA A, e.g., device 102 (FIG. 1), may transmit a second Self-CTS frame 722 in the Direction 2, for example, at a beginning of a second transmission sequence 720. The Self-CTS frame 722 may be followed, for example, by a transmission of a sequence of group-addressed frames and a BAR in the Direction 2.

Figure 8:
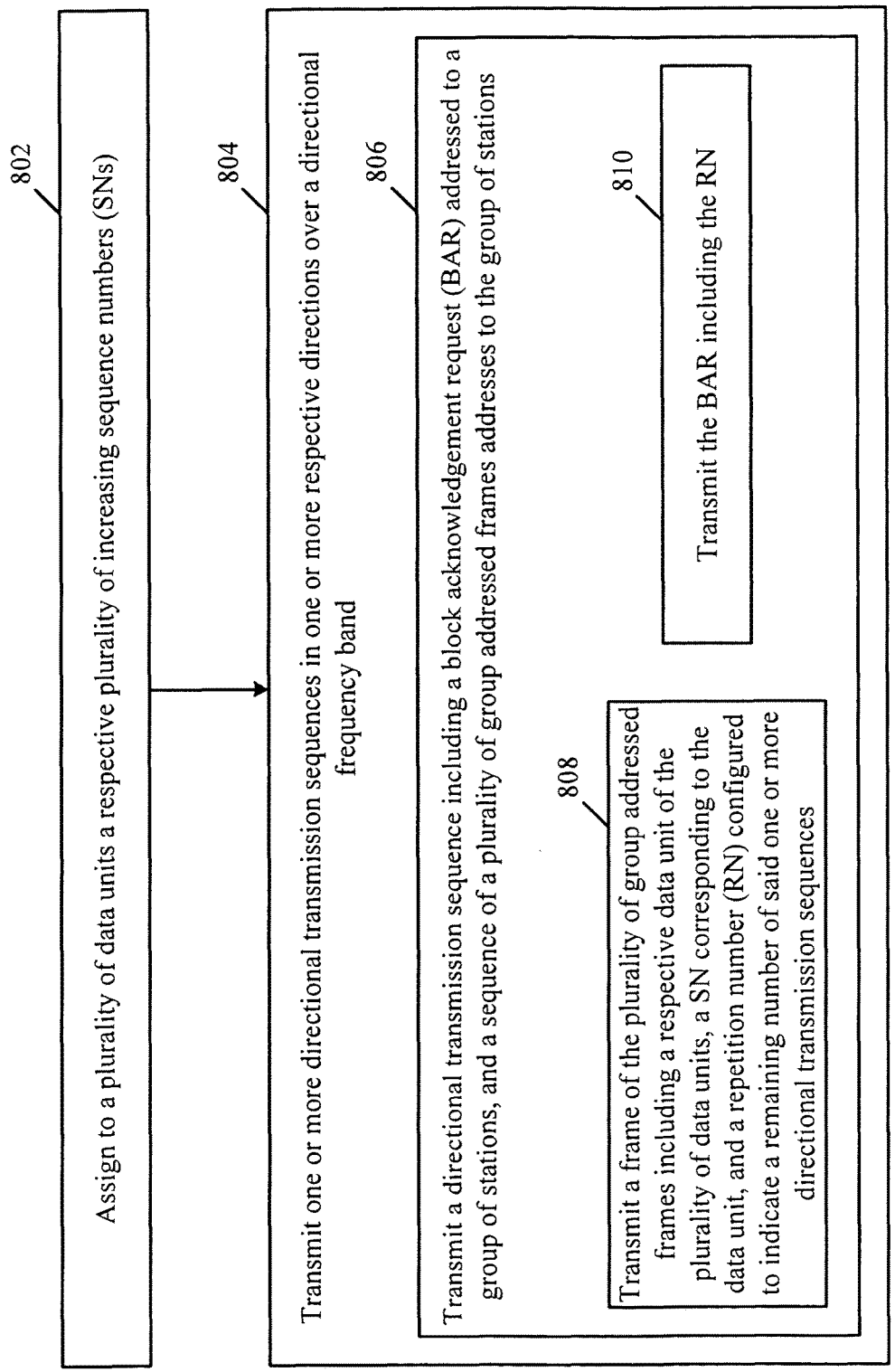
FIG. 8 is a schematic flow-chart illustration of a method of transmitting a sequence of group addressed frames to a plurality of wireless stations, in accordance with some demonstrative embodiments.

Reference is made to FIG. 8, which schematically illustrates a method of transmitting a sequence of group addressed frames to a plurality of wireless stations, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), a controller, e.g., controller 124 (FIG. 1), a radio, e.g., radio 114 (FIG. 1), and/or a message processor, e.g., message processor 128 (FIG. 1).

As indicated at block 802, the method may include assigning to a plurality of data units a respective plurality of increasing sequence numbers (SNs). For example, controller 124 (FIG. 1) may trigger, cause, control and/or instruct the wireless station implemented by device 102 (FIG. 1) to assign to a plurality of data units a respective plurality of increasing SNs, e.g., as describe d above.

As indicated at block 804, the method may include transmitting one or more directional transmission sequences in one or more respective directions over a directional frequency band. For example, controller 124 (FIG. 1) may trigger, cause, control and/or instruct the wireless station implemented by device 102 (FIG. 1) to transmit the directional transmission sequences 530, 540, 550, and/or 560 (FIG. 5), e.g., as described above.

As indicated at block 806, transmitting the one or more directional transmission sequences may include transmitting a directional transmission sequence including a block acknowledgement request (BAR) addressed to a group of stations, and a sequence of a plurality of group addressed frames addressed to the group of stations. For example, controller 124 (FIG. 1) may trigger, cause, control and/or instruct the wireless station implemented by device 102 (FIG. 1) to transmit a directional transmission sequence, e.g., a directional transmission sequence of directional transmission sequences 530, 540, 550, and/or 560 (FIG. 5), including a BAR addressed to a group of stations, and a sequence of a plurality of group addressed frames addressed to the group of stations, e.g., as described above.

As indicated at block 808, transmitting the sequence of the plurality of group addressed frames may include transmitting a frame of the plurality of group addressed frames including a respective data unit of the plurality of data units, a SN corresponding to the data unit, and a repetition number (RN) to indicate a remaining number of the one or more directional transmission sequences. For example, controller 124 (FIG. 1) may trigger, cause, control and/or instruct the wireless station implemented by device 102 (FIG. 1) to transmit a frame of the plurality of group addressed frames including a respective data unit of the plurality of data units, a SN corresponding to the data unit, and a RN configured to indicate a remaining number of the one or more directional transmission sequences, e.g., as described above.

As indicated at block 810, transmitting the BAR may include transmitting the BAR including the RN. For example, controller 124 (FIG. 1) may trigger, cause, control and/or instruct the wireless station implemented by device 102 (FIG. 1) to transmit the BAR in the directional transmission sequence including the same RN as in the frames of the directional transmission sequence, e.g., as described above.

Figure 9:
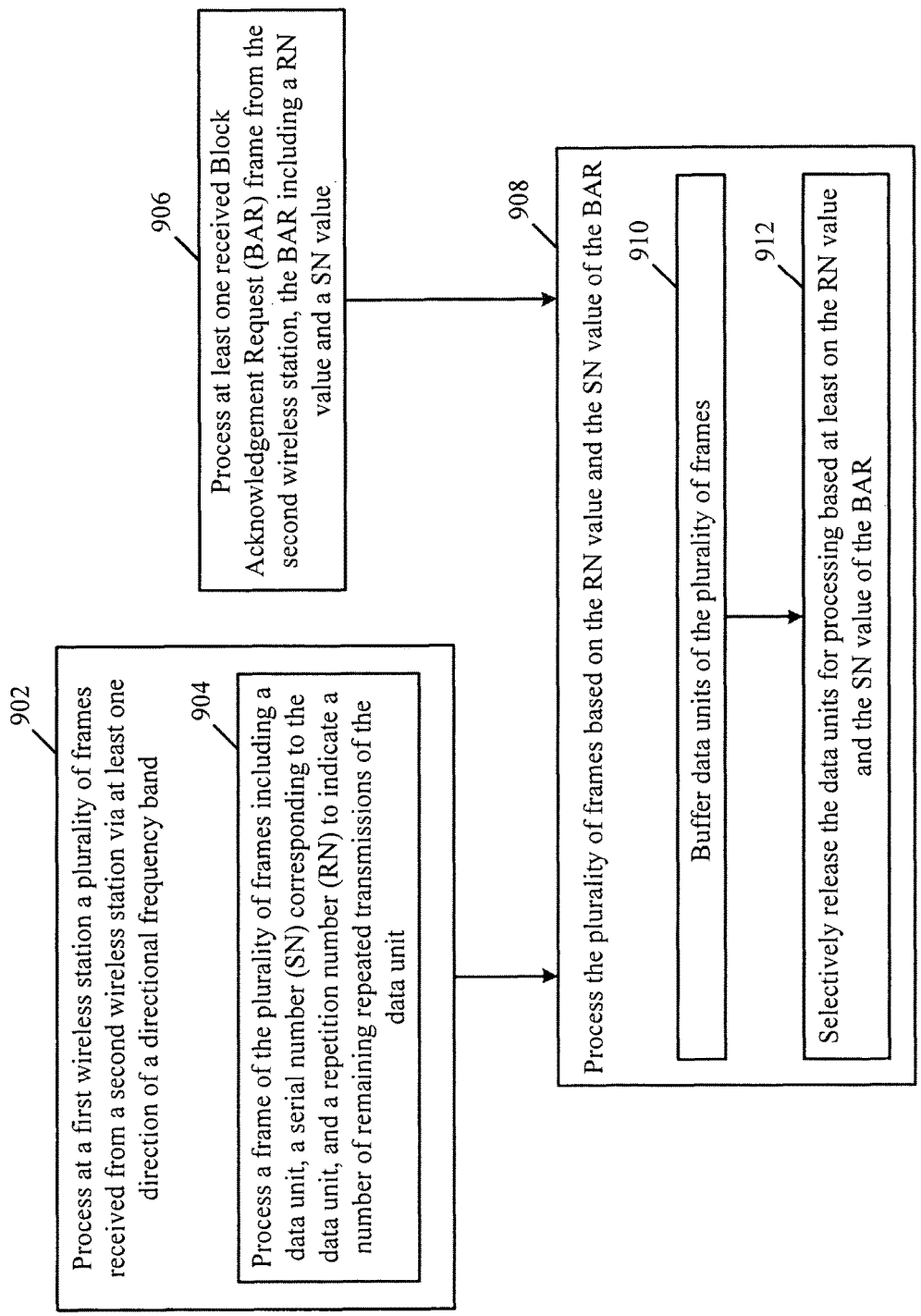
FIG. 9 is a schematic flow-chart illustration of a method of processing a plurality of group addressed frames from a wireless station, in accordance with some demonstrative embodiments.

Reference is made to FIG. 9, which schematically illustrates a method of processing a plurality of group addressed frames from a wireless station, in accordance with some demonstrative embodiments. For example, one or more of the operations of the method of FIG. 9 may be performed by one or more elements of a system, e.g., system 100 (FIG. 1), for example, one or more wireless devices, e.g., device 140 (FIG. 1) and/or device 115 (FIG. 1), a controller, e.g., controller 154 (FIG. 1), a radio, e.g., radio 144 (FIG. 1), and/or a message processor, e.g., message processor 158 (FIG. 1).

As indicated at block 902, the method may include processing at a first wireless station a plurality of frames received from a second wireless station via at least one direction of a directional frequency band. For example, controller 154 (FIG. 1) may trigger, cause, control and/or instruct the wireless station implemented by device 140 (FIG. 1) to process a plurality of frames received from device 102 (FIG. 1) via at least one direction of a directional frequency band, e.g., as described above.

As indicted at block 904, processing the plurality of frames may include processing a frame of the plurality of frames including a data unit, a serial number (SN) corresponding to the data unit, and a repetition number (RN) to indicate a number of remaining repeated transmissions of the data unit. For example, controller 154 (FIG. 1) may trigger, cause, control and/or instruct the wireless station implemented by device 140 (FIG. 1) to process one or more frames of the directional transmission sequences 530, 540, 550, and/or 560 (FIG. 5), e.g., as described above.

As indicated at block 906, the method may include processing at least one received Block Acknowledgement Request (BAR) frame from the second wireless station, the BAR including a RN value and a SN value. For example, controller 154 (FIG. 1) may trigger, cause, control and/or instruct the wireless station implemented by device 140 (FIG. 1) to process one or more BAR frames of the directional transmission sequences 530, 540, 550, and/or 560 (FIG. 5), e.g., as described above.

As indicated at block 908, the method may include processing the plurality of frames based on the RN value and the SN value of the BAR. For example, controller 154 (FIG. 1) may trigger, cause, control and/or instruct the wireless station implemented by device 140 (FIG. 1) to process frames received from device 102 (FIG. 1), for example, based on the RN value and the SN value of the BAR, e.g., as described above.

As indicated at block 910, the method may include buffering data units of the plurality of frames. For example, controller 154 (FIG. 1) may trigger, cause, control and/or instruct the wireless station implemented by device 140 (FIG. 1) to buffer the date units of the frames received from device 102 (FIG. 1), for example, in buffer 199 (FIG. 1), e.g., as described above.

As indicated at block 912, the method may include selectively releasing the data units for processing based at least on the RN value and the SN value of the BAR. For example, controller 154 (FIG. 1) may trigger, cause, control and/or instruct the wireless station implemented by device 140 (FIG. 1) to selectively release data units from buffer 199 (FIG. 1) for processing, for example, based at least on the RN value and the SN value of the BAR, e.g., as described above.

Figure 10:
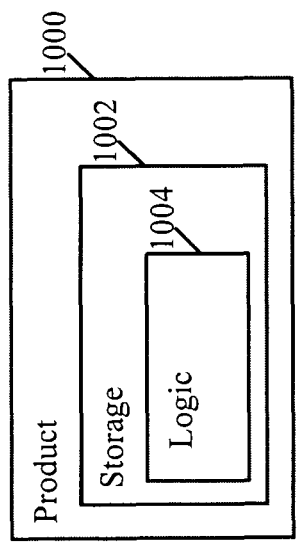
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at device 102 (FIG. 1), device 115 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processors 128 (FIG. 1), message processor 158 (FIG. 1), buffer 199 (FIG. 1), and/or to perform, trigger and/or implement one or more operations and/or functionalities of FIGS. 2, 3, 4, 5, 6, 7, 8, and/or 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a memory and a processor, the processor configured to cause a wireless station to assign to a plurality of data units a respective plurality of increasing sequence numbers (SNs); and transmit one or more directional transmission sequences in one or more respective directions over a directional frequency band, a directional transmission sequence of the one or more directional transmission sequences comprising a block acknowledgement request (BAR) addressed to a group of stations, the BAR comprising a repetition number (RN) indicating a remaining number of the one or more directional transmission sequences; and a sequence of a plurality of group addressed frames addressed to the group of stations, wherein a frame of the plurality of group addressed frames comprises a respective data unit of the plurality of data units; a SN corresponding to the data unit; and the RN.

Example 2 includes the subject matter of Example 1, and optionally, wherein the BAR comprises a Transmit Address (TA) field comprising an address of the wireless station.

Example 3 includes the subject matter of Example 1 or 2, and optionally, wherein the BAR comprises a highest SN transmitted before the BAR in a direction of the BAR.

Example 4 includes the subject matter of any one of Examples 1-3, and optionally, wherein the processor is configured to cause the wireless station to transmit the BAR prior to the sequence of the plurality of group addressed frames.

Example 5 includes the subject matter of any one of Examples 1-3, and optionally, wherein the processor is configured to cause the wireless station to transmit the BAR after the sequence of the plurality of group addressed frames.

Example 6 includes the subject matter of any one of Examples 1-5, and optionally, wherein the processor is configured to cause the wireless station to transmit a Self-Clear-To-Send (Self-CTS) frame at the beginning of the directional transmission sequence.

Example 7 includes the subject matter of any one of Examples 1-6, and optionally, wherein the processor is configured to cause the wireless station to limit a number of frames in the plurality of group addressed frames based on a window size published by a control station.

Example 8 includes the subject matter of any one of Examples 1-7, and optionally, wherein the one or more directional transmission sequences comprise a plurality of directional transmission sequences in a respective plurality of directions, each of the plurality of directional transmission sequences comprising a repetition of the plurality of data units.

Example 9 includes the subject matter of Example 8, and optionally, wherein the plurality of directions comprise at least a first direction and a second direction, the first direction covering at least one first station of the group of stations, and the second direction covering at least one second station of the group of stations.

Example 10 includes the subject matter of any one of Examples 1-9, and optionally, wherein the directional frequency band is a Directional Multi-Gigabit (DMG) band.

Example 11 includes the subject matter of any one of Examples 1-10, and optionally, wherein the wireless station is a Directional Multi-Gigabit (DMG) Station (STA).

Example 12 includes the subject matter of any one of Examples 1-11, and optionally, comprising a radio to transmit the one or more directional transmission sequences.

Example 13 includes the subject matter of any one of Examples 1-12, and optionally, comprising one or more directional antennas.

Example 14 includes a system of wireless communication comprising a wireless station, the wireless station comprising one or more directional antennas; a memory; and a processor configured to cause the wireless station to assign to a plurality of data units a respective plurality of increasing sequence numbers (SNs); and transmit one or more directional transmission sequences in one or more respective directions over a directional frequency band, a directional transmission sequence of the one or more directional transmission sequences comprising a block acknowledgement request (BAR) addressed to a group of stations, the BAR comprising a repetition number (RN) indicating a remaining number of the one or more directional transmission sequences; and a sequence of a plurality of group addressed frames addressed to the group of stations, wherein a frame of the plurality of group addressed frames comprises a respective data unit of the plurality of data units; a SN corresponding to the data unit; and the RN.

Example 15 includes the subject matter of Example 14, and optionally, wherein the BAR comprises a Transmit Address (TA) field comprising an address of the wireless station.

Example 16 includes the subject matter of Example 14 or 15, and optionally, wherein the BAR comprises a highest SN transmitted before the BAR in a direction of the BAR.

Example 17 includes the subject matter of any one of Examples 14-16, and optionally, wherein the processor is configured to cause the wireless station to transmit the BAR prior to the sequence of the plurality of group addressed frames.

Example 18 includes the subject matter of any one of Examples 14-16, and optionally, wherein the processor is configured to cause the wireless station to transmit the BAR after the sequence of the plurality of group addressed frames.

Example 19 includes the subject matter of any one of Examples 14-18, and optionally, wherein the processor is configured to cause the wireless station to transmit a Self-Clear-To-Send (Self-CTS) frame at the beginning of the directional transmission sequence.

Example 20 includes the subject matter of any one of Examples 14-19, and optionally, wherein the processor is configured to cause the wireless station to limit a number of frames in the plurality of group addressed frames based on a window size published by a control station.

Example 21 includes the subject matter of any one of Examples 14-20, and optionally, wherein the one or more directional transmission sequences comprise a plurality of directional transmission sequences in a respective plurality of directions, each of the plurality of directional transmission sequences comprising a repetition of the plurality of data units.

Example 22 includes the subject matter of Example 21, and optionally, wherein the plurality of directions comprise at least a first direction and a second direction, the first direction covering at least one first station of the group of stations, and the second direction covering at least one second station of the group of stations.

Example 23 includes the subject matter of any one of Examples 14-22, and optionally, wherein the directional frequency band is a Directional Multi-Gigabit (DMG) band.

Example 24 includes the subject matter of any one of Examples 14-23, and optionally, wherein the wireless station is a Directional Multi-Gigabit (DMG) Station (STA).

Example 25 includes the subject matter of any one of Examples 14-24, and optionally, wherein the wireless station comprises a radio to transmit the one or more directional transmission sequences.

Example 26 includes a method to be performed at a wireless station, the method comprising assigning to a plurality of data units a respective plurality of increasing sequence numbers (SNs); and transmitting one or more directional transmission sequences in one or more respective directions over a directional frequency band, a directional transmission sequence of the one or more directional transmission sequences comprising a block acknowledgement request (BAR) addressed to a group of stations, the BAR comprising a repetition number (RN) indicating a remaining number of the one or more directional transmission sequences; and a sequence of a plurality of group addressed frames addressed to the group of stations, wherein a frame of the plurality of group addressed frames comprises a respective data unit of the plurality of data units; a SN corresponding to the data unit; and the RN.

Example 27 includes the subject matter of Example 26, and optionally, wherein the BAR comprises a Transmit Address (TA) field comprising an address of the wireless station.

Example 28 includes the subject matter of Example 26 or 27, and optionally, wherein the BAR comprises a highest SN transmitted before the BAR in a direction of the BAR.

Example 29 includes the subject matter of any one of Examples 26-28, and optionally, comprising transmitting the BAR prior to the sequence of the plurality of group addressed frames.

Example 30 includes the subject matter of any one of Examples 26-28, and optionally, comprising transmitting the BAR after the sequence of the plurality of group addressed frames.

Example 31 includes the subject matter of any one of Examples 26-30, and optionally, comprising transmitting a Self-Clear-To-Send (Self-CTS) frame at the beginning of the directional transmission sequence.

Example 32 includes the subject matter of any one of Examples 26-31, and optionally, comprising limiting a number of frames in the plurality of group addressed frames based on a window size published by a control station.

Example 33 includes the subject matter of any one of Examples 26-32, and optionally, wherein the one or more directional transmission sequences comprise a plurality of directional transmission sequences in a respective plurality of directions, each of the plurality of directional transmission sequences comprising a repetition of the plurality of data units.

Example 34 includes the subject matter of Example 33, and optionally, wherein the plurality of directions comprise at least a first direction and a second direction, the first direction covering at least one first station of the group of stations, and the second direction covering at least one second station of the group of stations.

Example 35 includes the subject matter of any one of Examples 26-34, and optionally, wherein the directional frequency band is a Directional Multi-Gigabit (DMG) band.

Example 36 includes the subject matter of any one of Examples 26-35, and optionally, wherein the wireless station is a Directional Multi-Gigabit (DMG) Station (STA).

Example 37 includes a product comprising one or more tangible computer-readable non-transitory storage media comprising computer-executable instructions operable to, when executed by at least one computer processor, enable the at least one computer processor to implement one or more operations at a wireless station, the operations comprising assigning to a plurality of data units a respective plurality of increasing sequence numbers (SNs); and transmitting one or more directional transmission sequences in one or more respective directions over a directional frequency band, a directional transmission sequence of the one or more directional transmission sequences comprising a block acknowledgement request (BAR) addressed to a group of stations, the BAR comprising a repetition number (RN) indicating a remaining number of the one or more directional transmission sequences; and a sequence of a plurality of group addressed frames addressed to the group of stations, wherein a frame of the plurality of group addressed frames comprises a respective data unit of the plurality of data units; a SN corresponding to the data unit; and the RN.

Example 38 includes the subject matter of Example 37, and optionally, wherein the BAR comprises a Transmit Address (TA) field comprising an address of the wireless station.

Example 39 includes the subject matter of Example 37 or 38, and optionally, wherein the BAR comprises a highest SN transmitted before the BAR in a direction of the BAR.

Example 40 includes the subject matter of any one of Examples 37-39, and optionally, wherein the operations comprise transmitting the BAR prior to the sequence of the plurality of group addressed frames.

Example 41 includes the subject matter of any one of Examples 37-39, and optionally, wherein the operations comprise transmitting the BAR after the sequence of the plurality of group addressed frames.

Example 42 includes the subject matter of any one of Examples 37-41, and optionally, wherein the operations comprise transmitting a Self-Clear-To-Send (Self-CTS) frame at the beginning of the directional transmission sequence.

Example 43 includes the subject matter of any one of Examples 37-42, and optionally, wherein the operations comprise limiting a number of frames in the plurality of group addressed frames based on a window size published by a control station.

Example 44 includes the subject matter of any one of Examples 37-43, and optionally, wherein the one or more directional transmission sequences comprise a plurality of directional transmission sequences in a respective plurality of directions, each of the plurality of directional transmission sequences comprising a repetition of the plurality of data units.

Example 45 includes the subject matter of Example 44, and optionally, wherein the plurality of directions comprise at least a first direction and a second direction, the first direction covering at least one first station of the group of stations, and the second direction covering at least one second station of the group of stations.

Example 46 includes the subject matter of any one of Examples 37-45, and optionally, wherein the directional frequency band is a Directional Multi-Gigabit (DMG) band.

Example 47 includes the subject matter of any one of Examples 37-46, and optionally, wherein the wireless station is a Directional Multi-Gigabit (DMG) Station (STA).

Example 48 includes an apparatus of a wireless station, the apparatus comprising means for assigning to a plurality of data units a respective plurality of increasing sequence numbers (SNs); and means for transmitting one or more directional transmission sequences in one or more respective directions over a directional frequency band, a directional transmission sequence of the one or more directional transmission sequences comprising a block acknowledgement request (BAR) addressed to a group of stations, the BAR comprising a repetition number (RN) indicating a remaining number of the one or more directional transmission sequences; and a sequence of a plurality of group addressed frames addressed to the group of stations, wherein a frame of the plurality of group addressed frames comprises a respective data unit of the plurality of data units; a SN corresponding to the data unit; and the RN.

Example 49 includes the subject matter of Example 48, and optionally, wherein the BAR comprises a Transmit Address (TA) field comprising an address of the wireless station.

Example 50 includes the subject matter of Example 48 or 49, and optionally, wherein the BAR comprises a highest SN transmitted before the BAR in a direction of the BAR.

Example 51 includes the subject matter of any one of Examples 48-50, and optionally, comprising means for transmitting the BAR prior to the sequence of the plurality of group addressed frames.

Example 52 includes the subject matter of any one of Examples 48-50, and optionally, comprising means for transmitting the BAR after the sequence of the plurality of group addressed frames.

Example 53 includes the subject matter of any one of Examples 48-52, and optionally, comprising means for transmitting a Self-Clear-To-Send (Self-CTS) frame at the beginning of the directional transmission sequence.

Example 54 includes the subject matter of any one of Examples 48-53, and optionally, comprising means for limiting a number of frames in the plurality of group addressed frames based on a window size published by a control station.

Example 55 includes the subject matter of any one of Examples 48-54, and optionally, wherein the one or more directional transmission sequences comprise a plurality of directional transmission sequences in a respective plurality of directions, each of the plurality of directional transmission sequences comprising a repetition of the plurality of data units.

Example 56 includes the subject matter of Example 55, and optionally, wherein the plurality of directions comprise at least a first direction and a second direction, the first direction covering at least one first station of the group of stations, and the second direction covering at least one second station of the group of stations.

Example 57 includes the subject matter of any one of Examples 48-56, and optionally, wherein the directional frequency band is a Directional Multi-Gigabit (DMG) band.

Example 58 includes the subject matter of any one of Examples 48-57, and optionally, wherein the wireless station is a Directional Multi-Gigabit (DMG) Station (STA).

Example 59 includes an apparatus comprising a memory and a processor, the processor configured to cause a first wireless station to process reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit; process reception of at least one Block Acknowledgement Request (BAR) frame from the second wireless station, the BAR comprising a RN value and a SN value; and process the plurality of frames based on the RN value and the SN value of the BAR.

Example 60 includes the subject matter of Example 59, and optionally, wherein the processor is configured to cause the first wireless station to buffer data units of the plurality of frames, and to selectively release the data units for processing based at least on the RN value and the SN value of the BAR.

Example 61 includes the subject matter of Example 60, and optionally, wherein the processor is configured to cause the first wireless station to determine a buffer size to buffer the data units based on a window size published by a control station.

Example 62 includes the subject matter of any one of Examples 59-61, and optionally, wherein the BAR comprises a Transmit Address (TA) field comprising an address of the second wireless station.

Example 63 includes the subject matter of any one of Examples 59-62, and optionally, wherein the processor is configured to cause the first wireless station to determine a directionality to receive the plurality of frames based on a Transmit Address (TA) field of a BAR received prior to the plurality of frames.

Example 64 includes the subject matter of any one of Examples 59-63, and optionally, wherein the BAR comprises a highest SN transmitted from the second wireless station before the BAR in a direction of the BAR.

Example 65 includes the subject matter of any one of Examples 59-64, and optionally, wherein the processor is configured to cause the first wireless station to process reception of the BAR prior to the plurality of frames.

Example 66 includes the subject matter of any one of Examples 59-64, and optionally, wherein the processor is configured to cause the first wireless station to process reception of the BAR after to the plurality of frames.

Example 67 includes the subject matter of any one of Examples 59-66, and optionally, wherein the processor is configured to cause the first wireless station to process a Self-Clear-To-Send (Self-CTS) frame from the second wireless station prior to the plurality of frames.

Example 68 includes the subject matter of any one of Examples 59-67, and optionally, wherein the directional frequency band is a Directional Multi-Gigabit (DMG) band.

Example 69 includes the subject matter of any one of Examples 59-68, and optionally, wherein the first wireless station is a Directional Multi-Gigabit (DMG) Station (STA).

Example 70 includes the subject matter of any one of Examples 59-69, and optionally, comprising a receiver to receive the plurality of frames.

Example 71 includes the subject matter of any one of Examples 59-70, and optionally, comprising one or more directional antennas.

Example 72 includes a system of wireless communication comprising a first wireless station, the wireless station comprising one or more directional antennas; a memory; and a processor configured to cause the first wireless station to process reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit; process reception of at least one Block Acknowledgement Request (BAR) frame from the second wireless station, the BAR comprising a RN value and a SN value; and process the plurality of frames based on the RN value and the SN value of the BAR.

Example 73 includes the subject matter of Example 72, and optionally, wherein the processor is configured to cause the first wireless station to buffer data units of the plurality of frames, and to selectively release the data units for processing based at least on the RN value and the SN value of the BAR.

Example 74 includes the subject matter of Example 73, and optionally, wherein the processor is configured to cause the first wireless station to determine a buffer size to buffer the data units based on a window size published by a control station.

Example 75 includes the subject matter of any one of Examples 72-74, and optionally, wherein the BAR comprises a Transmit Address (TA) field comprising an address of the second wireless station.

Example 76 includes the subject matter of any one of Examples 72-75, and optionally, wherein the processor is configured to cause the first wireless station to determine a directionality to receive the plurality of frames based on a Transmit Address (TA) field of a BAR received prior to the plurality of frames.

Example 77 includes the subject matter of any one of Examples 72-76, and optionally, wherein the BAR comprises a highest SN transmitted from the second wireless station before the BAR in a direction of the BAR.

Example 78 includes the subject matter of any one of Examples 72-77, and optionally, wherein the processor is configured to cause the first wireless station to process reception of the BAR prior to the plurality of frames.

Example 79 includes the subject matter of any one of Examples 72-77, and optionally, wherein the processor is configured to cause the first wireless station to process reception of the BAR after to the plurality of frames.

Example 80 includes the subject matter of any one of Examples 72-79, and optionally, wherein the processor is configured to cause the first wireless station to process a Self-Clear-To-Send (Self-CTS) frame from the second wireless station prior to the plurality of frames.

Example 81 includes the subject matter of any one of Examples 72-80, and optionally, wherein the directional frequency band is a Directional Multi-Gigabit (DMG) band.

Example 82 includes the subject matter of any one of Examples 72-81, and optionally, wherein the first wireless station is a Directional Multi-Gigabit (DMG) Station (STA).

Example 83 includes the subject matter of any one of Examples 72-82, and optionally, wherein the first wireless device comprises a receiver to receive the plurality of frames.

Example 84 includes a method to be performed at a first wireless station, the method comprising processing reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit; processing reception of at least one Block Acknowledgement Request (BAR) frame from the second wireless station, the BAR comprising a RN value and a SN value; and processing the plurality of frames based on the RN value and the SN value of the BAR.

Example 85 includes the subject matter of Example 84, and optionally, comprising buffering data units of the plurality of frames, and selectively releasing the data units for processing based at least on the RN value and the SN value of the BAR.

Example 86 includes the subject matter of Example 85, and optionally, comprising determining a buffer size to buffer the data units based on a window size published by a control station.

Example 87 includes the subject matter of any one of Examples 84-86, and optionally, wherein the BAR comprises a Transmit Address (TA) field comprising an address of the second wireless station.

Example 88 includes the subject matter of any one of Examples 84-87, and optionally, comprising determining a directionality to receive the plurality of frames based on a Transmit Address (TA) field of a BAR received prior to the plurality of frames.

Example 89 includes the subject matter of any one of Examples 84-88, and optionally, wherein the BAR comprises a highest SN transmitted from the second wireless station before the BAR in a direction of the BAR.

Example 90 includes the subject matter of any one of Examples 84-89, and optionally, comprising processing reception of the BAR prior to the plurality of frames.

Example 91 includes the subject matter of any one of Examples 84-89, and optionally, comprising processing reception of the BAR after to the plurality of frames.

Example 92 includes the subject matter of any one of Examples 84-91, and optionally, comprising processing a Self-Clear-To-Send (Self-CTS) frame from the second wireless station prior to the plurality of frames.

Example 93 includes the subject matter of any one of Examples 84-92, and optionally, wherein the directional frequency band is a Directional Multi-Gigabit (DMG) band.

Example 94 includes the subject matter of any one of Examples 84-93, and optionally, wherein the first wireless station is a Directional Multi-Gigabit (DMG) Station (STA).

Example 95 includes a product comprising one or more tangible computer-readable non-transitory storage media comprising computer-executable instructions operable to, when executed by at least one computer processor, enable the at least one computer processor to implement one or more operations at a first wireless station, the operations comprising processing reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit; processing reception of at least one Block Acknowledgement Request (BAR) frame from the second wireless station, the BAR comprising a RN value and a SN value; and processing the plurality of frames based on the RN value and the SN value of the BAR.

Example 96 includes the subject matter of Example 95, and optionally, wherein the operations comprise buffering data units of the plurality of frames, and selectively releasing the data units for processing based at least on the RN value and the SN value of the BAR.

Example 97 includes the subject matter of Example 96, and optionally, wherein the operations comprise determining a buffer size to buffer the data units based on a window size published by a control station.

Example 98 includes the subject matter of any one of Examples 95-97, and optionally, wherein the BAR comprises a Transmit Address (TA) field comprising an address of the second wireless station.

Example 99 includes the subject matter of any one of Examples 95-98, and optionally, wherein the operations comprise determining a directionality to receive the plurality of frames based on a Transmit Address (TA) field of a BAR received prior to the plurality of frames.

Example 100 includes the subject matter of any one of Examples 95-99, and optionally, wherein the BAR comprises a highest SN transmitted from the second wireless station before the BAR in a direction of the BAR.

Example 101 includes the subject matter of any one of Examples 95-100, and optionally, wherein the operations comprise processing reception of the BAR prior to the plurality of frames.

Example 102 includes the subject matter of any one of Examples 95-100, and optionally, wherein the operations comprise processing reception of the BAR after to the plurality of frames.

Example 103 includes the subject matter of any one of Examples 95-102, and optionally, wherein the operations comprise processing a Self-Clear-To-Send (Self-CTS) frame from the second wireless station prior to the plurality of frames.

Example 104 includes the subject matter of any one of Examples 95-103, and optionally, wherein the directional frequency band is a Directional Multi-Gigabit (DMG) band.

Example 105 includes the subject matter of any one of Examples 95-104, and optionally, wherein the first wireless station is a Directional Multi-Gigabit (DMG) Station (STA).

Example 106 includes an apparatus of a first wireless station, the apparatus comprising means for processing reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit; means for processing reception of at least one Block Acknowledgement Request (BAR) frame from the second wireless station, the BAR comprising a RN value and a SN value; and means for processing the plurality of frames based on the RN value and the SN value of the BAR.

Example 107 includes the subject matter of Example 106, and optionally, comprising means for buffering data units of the plurality of frames, and selectively releasing the data units for processing based at least on the RN value and the SN value of the BAR.

Example 108 includes the subject matter of Example 107, and optionally, comprising means for determining a buffer size to buffer the data units based on a window size published by a control station.

Example 109 includes the subject matter of any one of Examples 106-108, and optionally, wherein the BAR comprises a Transmit Address (TA) field comprising an address of the second wireless station.

Example 110 includes the subject matter of any one of Examples 106-109, and optionally, comprising means for determining a directionality to receive the plurality of frames based on a Transmit Address (TA) field of a BAR received prior to the plurality of frames.

Example 111 includes the subject matter of any one of Examples 106-110, and optionally, wherein the BAR comprises a highest SN transmitted from the second wireless station before the BAR in a direction of the BAR.

Example 112 includes the subject matter of any one of Examples 106-111, and optionally, comprising means for processing reception of the BAR prior to the plurality of frames.

Example 113 includes the subject matter of any one of Examples 106-111, and optionally, comprising means for processing reception of the BAR after to the plurality of frames.

Example 114 includes the subject matter of any one of Examples 106-113, and optionally, comprising means for processing a Self-Clear-To-Send (Self-CTS) frame from the second wireless station prior to the plurality of frames.

Example 115 includes the subject matter of any one of Examples 106-114, and optionally, wherein the directional frequency band is a Directional Multi-Gigabit (DMG) band.

Example 116 includes the subject matter of any one of Examples 106-115, and optionally, wherein the first wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory and a processor, the processor configured to cause a wireless station to:
assign to a plurality of data units a respective plurality of increasing sequence numbers (SNs); and
transmit one or more directional transmission sequences in one or more respective directions over a directional frequency band, a directional transmission sequence of the one or more directional transmission sequences comprising:
a block acknowledgement request (BAR) addressed to a group of stations, the BAR comprising a repetition number (RN) indicating a remaining number of said one or more directional transmission sequences; and
a sequence of a plurality of group addressed frames addressed to the group of stations, wherein a frame of the plurality of group addressed frames comprises:

a respective data unit of the plurality of data units;
a SN corresponding to the data unit; and
the RN.

2. The apparatus of claim 1, wherein the BAR comprises a Transmit Address (TA) field comprising an address of the wireless station.

3. The apparatus of claim 1, wherein the BAR comprises a highest SN transmitted before the BAR in a direction of the BAR.

4. The apparatus of claim 1, wherein the processor is configured to cause the wireless station to transmit the BAR prior to the sequence of the plurality of group addressed frames.

5. The apparatus of claim 1, wherein the processor is configured to cause the wireless station to transmit the BAR after the sequence of the plurality of group addressed frames.

6. The apparatus of claim 1, wherein the processor is configured to cause the wireless station to transmit a Self-Clear-To-Send (Self-CTS) frame at the beginning of the directional transmission sequence.

7. The apparatus of claim 1, wherein the processor is configured to cause the wireless station to limit a number of frames in the plurality of group addressed frames based on a window size published by a control station.

8. The apparatus of claim 1, wherein the one or more directional transmission sequences comprise a plurality of directional transmission sequences in a respective plurality of directions, each of the plurality of directional transmission sequences comprising a repetition of the plurality of data units.

9. The apparatus of claim 8, wherein the plurality of directions comprise at least a first direction and a second direction, the first direction covering at least one first station of the group of stations, and the second direction covering at least one second station of the group of stations.

10. The apparatus of claim 1, wherein the directional frequency band is a Directional Multi-Gigabit (DMG) band.

11. The apparatus of claim 1 comprising a radio to transmit the one or more directional transmission sequences.

12. The apparatus of claim 1 comprising one or more directional antennas.

13. A product comprising one or more tangible computer-readable non-transitory storage media comprising computer-executable instructions operable to, when executed by at least one computer processor, enable the at least one computer processor to implement one or more operations at a wireless station, the operations comprising:
assigning to a plurality of data units a respective plurality of increasing sequence numbers (SNs); and
transmitting one or more directional transmission sequences in one or more respective directions over a directional frequency band, a directional transmission sequence of the one or more directional transmission sequences comprising:
a block acknowledgement request (BAR) addressed to a group of stations, the BAR comprising a repetition number (RN) indicating a remaining number of said one or more directional transmission sequences; and
a sequence of a plurality of group addressed frames addressed to the group of stations, wherein a frame of the plurality of group addressed frames comprises:
a respective data unit of the plurality of data units;
a SN corresponding to the data unit; and
the RN.

14. The product of claim 13, wherein the one or more directional transmission sequences comprise a plurality of directional transmission sequences in a respective plurality of directions, each of the plurality of directional transmission sequences comprising a repetition of the plurality of data units.

15. The product of claim 14, wherein the plurality of directions comprise at least a first direction and a second direction, the first direction covering at least one first station of the group of stations, and the second direction covering at least one second station of the group of stations.

16. An apparatus comprising a memory and a processor, the processor configured to cause a first wireless station to:
process reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit;
process reception of at least one Block Acknowledgement Request (BAR) frame from the second wireless station, the BAR comprising a RN value and a SN value; and
process the plurality of frames based on the RN value and the SN value of the BAR.

17. The apparatus of claim 16, wherein the processor is configured to cause the first wireless station to buffer data units of the plurality of frames, and to selectively release the data units for processing based at least on the RN value and the SN value of the BAR.

18. The apparatus of claim 17, wherein the processor is configured to cause the first wireless station to determine a buffer size to buffer the data units based on a window size published by a control station.

19. The apparatus of claim 16, wherein the processor is configured to cause the first wireless station to determine a directionality to receive the plurality of frames based on a Transmit Address (TA) field of a BAR received prior to the plurality of frames.

20. The apparatus of claim 16, wherein the BAR comprises a highest SN transmitted from the second wireless station before the BAR in a direction of the BAR.

21. The apparatus of claim 16, wherein the processor is configured to cause the first wireless station to process reception of the BAR prior to the plurality of frames.

22. The apparatus of claim 16, wherein the processor is configured to cause the first wireless station to process reception of the BAR after to the plurality of frames.

23. The apparatus of claim 16 comprising one or more directional antennas.

24. A product comprising one or more tangible computer-readable non-transitory storage media comprising computer-executable instructions operable to, when executed by at least one computer processor, enable the at least one computer processor to implement one or more operations at a first wireless station, the operations comprising:
processing reception of a plurality of frames from a second wireless station via at least one direction of a directional frequency band, a frame of the plurality of frames comprises a data unit, a serial number (SN) corresponding to the data unit, and a repetition number (RN) to indicate a number of remaining repeated transmissions of the data unit;
processing reception of at least one Block Acknowledgement Request (BAR) frame from the second wireless station, the BAR comprising a RN value and a SN value; and
processing the plurality of frames based on the RN value and the SN value of the BAR.

25. The product of claim 24, wherein the operations comprise buffering data units of the plurality of frames, and selectively releasing the data units for processing based at least on the RN value and the SN value of the BAR.

* * * * *